June 6, 1933.    W. J. FOURNET    1,913,271
HARROW
Filed Aug. 23, 1932    2 Sheets-Sheet 1

Inventor
Willie J. Fournet

June 6, 1933. W. J. FOURNET 1,913,271
HARROW
Filed Aug. 23, 1932 2 Sheets-Sheet 2

Inventor
Willie J. Fournet
By Wm. L. Symons
Attorney

Patented June 6, 1933

1,913,271

UNITED STATES PATENT OFFICE

WILLIE J. FOURNET, OF ST. MARTINVILLE, LOUISIANA, ASSIGNOR OF ONE-HALF TO SIDNEY C. FOURNET, OF NEW ORLEANS, LOUISIANA

HARROW

Application filed August 23, 1932. Serial No. 630,107.

My invention relates to cultivators or harrows and more particularly to a harrow which is adaptable to meet variable conditions in the cultivation of land.

An important object of my invention is the provision of a harrow or cultivating device which will adapt itself to the slopes of the ground being cultivated.

Another object of my invention is to provide a device of this character which is simple in construction, inexpensive to manufacture, efficient in operation, strong and durable.

Other objects and advantages of my invention will be apparent during the course of the following description.

Figure 1:
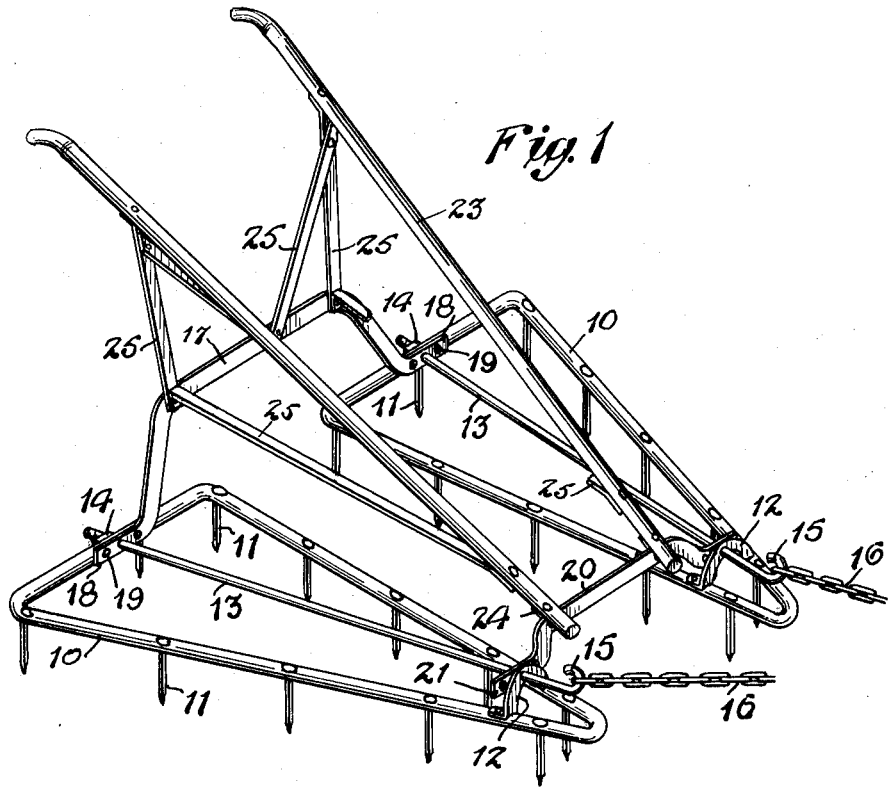
Figure 2:
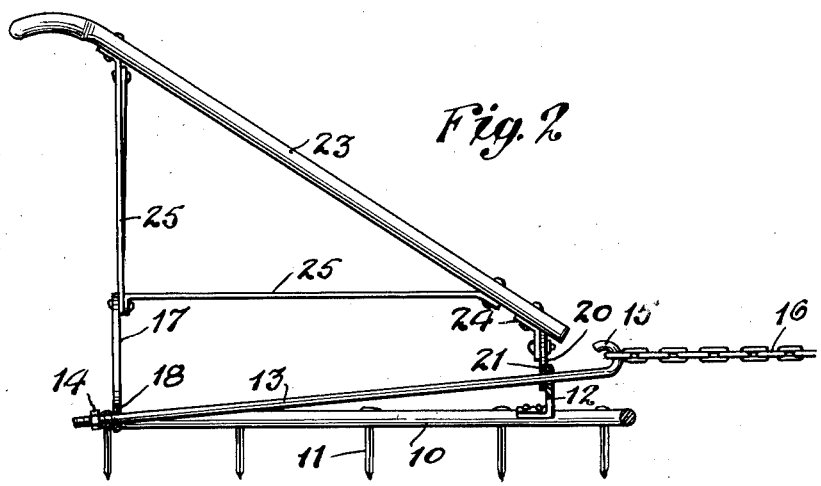
Figure 3:
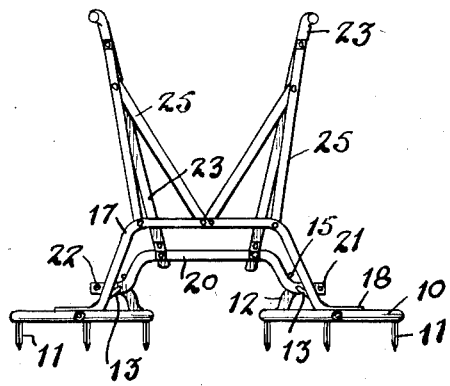
Figure 4:
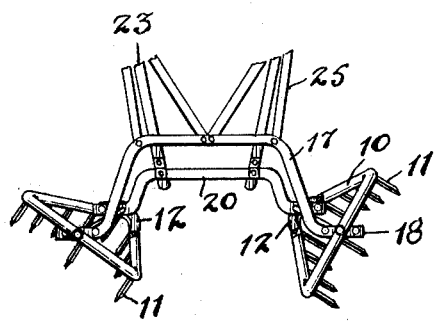
Figure 5:
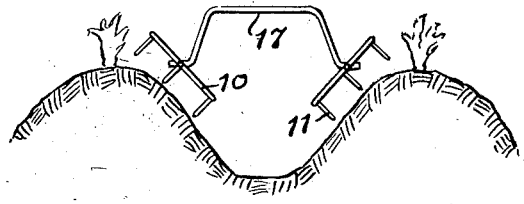
Figure 6:
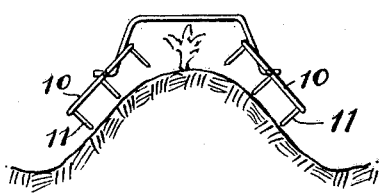
Figure 7:
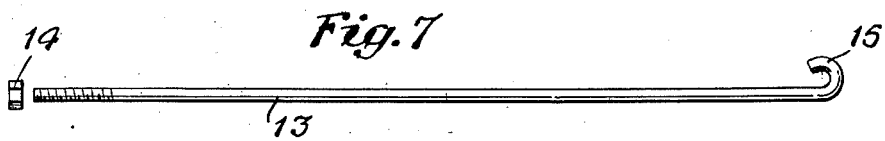

In the accompanying drawings, which form a part of this specification and wherein like characters of reference denote like parts throughout the same, Figure 1 is a perspective view of a cultivator or harrow embodying my invention, Figure 2 is a longitudinal sectional view thereof taken centrally of one of the harrow sections, Figure 3 is a rear elevation of my improved harrow, Figure 4 is a similar view showing an inclined position of the harrow sections, Figure 5 is a diagrammatic view illustrating the use of my improved harrow when used to cultivate the slopes of adjacent rows, Figure 6 is a similar view illustrating the position of the harrow when used to cultivate opposite slopes of the same row, and, Figure 7 is a detail elevation of the pin for pivotally supporting the harrow sections.

In the drawings, wherein for the purpose of illustration is shown a preferred embodiment of my invention, the numeral 10 designates the generally triangular frames of the harrow sections, said frames being provided on their lower sides with spaced cultivating spikes 11 which preferably extend entirely through the frames 10. The frames 10 are relatively long and narrow and the apex of the triangle forms the forward end of the harrow section. Substantially semi-circular brackets 12 are bolted or otherwise secured to the forward portion of each frame 10 at a point spaced from the extreme forward part thereof and extend upwardly a substantial distance above the frame. The brackets 12 are each provided with a central opening as are also the rear portions of the frames 10 and these openings are adapted to receive pivot pins 13 which extend longitudinally of the harrow frames. The rear ends of the pivot pins are screwthreaded to receive suitable nuts 14 which in use abut against the rear of the harrow frames and prevent the pivot pin being pulled through the openings in the frames. The forward ends of the pivot pins are bent over upon themselves to provide hooks 15 which are spaced in front of the brackets 12 and engage chains 16 or the like which are attached to the draft device.

A rear cross bar 17 is arched or of substantially inverted U-shape and has its arms bent to provide ears 18 with a plurality of openings 19 therein to receive the pivot pins 13. The pivot pins can be arranged in any one of the openings 19 depending upon the desired spacing of the harrow sections, and the ears 18 abut against the inner faces of the rear portions of the frames 10.

A forward cross bar 20 is arched or of substantially inverted U-shape and has arms bent over to provide ears 21 with a plurality of openings 22 therein to receive the pivot pins. The ears 21 abut against the rearward faces of the brackets 12. The cross bar 17 extends much higher in the center than does the forward cross bar 20. Suitable handle bars 23 are secured to the cross bar 20 by means of suitable brackets 24 and extend upwardly and rearwardly at an inclination. Suitable braces 25 connect the rearward brace bar with the handles 23 at points spaced from the rear of the handles.

It will be seen that the cross bars 17 and 20 support the harrow sections in spaced relation, through the medium of the pivot pins 13 which may be arranged in any of the openings 19 and 22 to provide the desired spacing or angle of the harrow sections. The cross bars 17 and 20 also support the handle bars 23 and their shape permits their passage over plants or obstructions, as seen in Figure 6. The cross bars 17 and 20, handles 23 and braces 25 form a supporting framework for the harrow sections.

The pivot pins 13 extend freely through the openings in the cross bars, harrow frames and brackets and permit self adjustment of the harrow sections. The harrow sections may readily take different inclinations as seen in Figure 4 where one section is more inclined than the other, and will therefore assume the inclination of the ground, as seen in Figures 5 and 6 where different conditions are illustrated. In addition to serving as pivot pins the pins 13 act as drawbars and transmit the draft pull to the harrow sections and to the cross bars. To remove the pivot pins it is only necessary to remove the nuts 14 and withdraw the pins, and the harrow sections are then released from the cross bars. The use of the brackets 12 imparts an upward inclination to the pivot pins 13 as seen in Figure 2. Other types of harrow sections may obviously be used; the spiked sections being illustrative only.

While I have shown and described the preferred embodiment of my invention, it is to be understood that various changes in the size, shape and arrangement of parts may be resorted to without departing from the spirit of my invention or the scope of the subjoined claims.

Having thus described my invention, what I claim and desire to protect by Letters Patent is:

1. In a device of the character described, a pair of substantially triangular harrow sections, brackets secured to the forward apex of each section, a supporting framework, and a pivot pin extending through the rear of each section and through the forward bracket on each section and pivotally connecting the sections to the supporting framework.

2. In a device of the character described, a pair of substantially triangular harrow sections, brackets secured to the forward apex of each section, a supporting framework, a pivot pin extending through the rear of each section and through the forward bracket on each section and pivotally connecting the sections to the supporting framework, and means to connect the forward portions of each pivot pin to a draft device.

3. In a device of the character described, a pair of cross bars having their ends provided with openings, a pair of generally triangular harrow sections, a bracket secured to the forward portion of each harrow section and provided with an opening, pivot pins passing freely through the opening in each bracket and through an opening in the rear of each harrow section, said pivot pins passing through the openings in the cross bars, one cross bar connecting the pivot pins immediately to the rear of the brackets on the harrow sections and the other of said cross bars connecting the pivot pins in front of the rearward portion of said harrow sections, and a handle bar connected to the cross bars.

4. In a device of the character described, a pair of cross bars having their ends provided with openings, a pair of harrow sections, a bracket secured to the forward portion of each harrow section and provided with an opening, pivot pins passing freely through the opening in each bracket and through an opening in the rear of each harrow section, said pivot pins passing through the openings in the cross bars, one cross bar connecting the pivot pins immediately to the rear of the brackets on the harrow sections and the other of said cross bars connecting the pivot pins in front of the rearward portion of said harrow sections, a handle bar connected to the cross bars, and means at the forward ends of the pivot pins for connection with a draft device.

5. In a device of the character described, a pair of centrally arched cross bars having their ends provided with openings, a pair of generally triangular spaced harrow sections, an upstanding bracket secured to the forward portion of each harrow section and provided with an opening, pivot pins passing freely through the opening in each bracket and through an opening in the rear of each harrow section, said pivot pins passing through the openings in the cross bars, one cross bar connecting the pivot pins immediately to the rear of the brackets on the harrow sections and the other of said cross bars connecting the pivot pins in front of the rearward portion of said harrow sections, and a pair of handle bars connected to the arched portions of the cross bars.

6. In a device of the character described, a pair of centrally arched cross bars having their ends provided with openings, a pair of spaced harrow sections, an upstanding bracket secured to the forward portion of each harrow section and provided with an opening, pivot pins passing freely through the opening in each bracket and through an opening in the rear of each harrow section, said pivot pins passing through the openings in the cross bars, one cross bar connecting the pivot pins immediately to the rear of the brackets on the harrow sections and the other of said cross bars connecting the pivot pins in front of the rearward portion of said harrow sections, a pair of handle bars connected to the arched portions of the cross bars, and said pivot pins having hooked forward portions for connection to a draft device.

7. In a device of the character described, a pair of harrow sections, brackets secured to the forward portion of each section, a supporting framework, and a pivot pin extending through the rear of each section and through the forward bracket on each section and pivotally connecting the sections to the supporting framework.

8. In a device of the character described, a pair of harrow sections, brackets secured to the forward portion of each section, a supporting framework, a pivot pin extending through the rear of each section and through the forward bracket on each section and pivotally connecting the sections to the supporting framework, and means to connect the forward portions of each pivot pin to a draft device.

In testimony whereof I affix my signature.

WILLIE J. FOURNET.